United States Patent
Ben-Ishay et al.

(10) Patent No.: US 11,726,666 B2
(45) Date of Patent: Aug. 15, 2023

(54) NETWORK ADAPTER WITH EFFICIENT STORAGE-PROTOCOL EMULATION

(71) Applicant: Mellanox Technologies, Ltd., Yokneam (IL)

(72) Inventors: Ben Ben-Ishay, Tel Aviv (IL); Boris Pismenny, Haifa (IL); Yorai Itzhak Zack, Haifa (IL); Khalid Manaa, Majd Alkrum (IL); Liran Liss, Misgav (IL); Uria Basher, Ganei Tal (IL); Or Gerlitz, Ramat-Gan (IL); Miriam Menes, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/372,466

(22) Filed: Jul. 11, 2021

(65) Prior Publication Data
US 2023/0010150 A1    Jan. 12, 2023

(51) Int. Cl.
*G06F 12/00* (2006.01)
*G06F 3/06* (2006.01)
(Continued)

(52) U.S. Cl.
CPC ............ *G06F 3/0619* (2013.01); *G06F 3/067* (2013.01); *G06F 3/0611* (2013.01);
(Continued)

(58) Field of Classification Search
CPC .... G06F 3/0619; G06F 3/0611; G06F 3/0659; G06F 3/067; G06F 3/0679; H04L 1/0041; H04L 1/0045; H04L 1/189
See application file for complete search history.

(56) References Cited

U.S. PATENT DOCUMENTS 5,003,465 A    3/1991 Chisholm et al.
5,615,404 A    3/1997 Knoll et al.
(Continued)

OTHER PUBLICATIONS

Bar-Ilan et al, U.S. Appl. No. 17/234,189, filed Apr. 19, 2021.
(Continued)

*Primary Examiner* — David Yi
*Assistant Examiner* — Tahilba O Puche
(74) *Attorney, Agent, or Firm* — Kligler & Associates Patent Attorneys Ltd

(57) ABSTRACT

A network adapter includes a network interface controller and a processor. The network interface controller is to communicate over a peripheral bus with a host, and over a network with a remote storage device. The processor is to expose on the peripheral bus a peripheral-bus device that communicates with the host using a bus storage protocol, to receive first I/O transactions of the bus storage protocol from the host, via the exposed peripheral-bus device, and to complete the first I/O transactions in the remote storage device by (i) translating between the first I/O transactions and second I/O transactions of a network storage protocol, and (ii) executing the second I/O transactions in the remote storage device. For receiving and completing the first I/O transactions, the processor is to cause the network interface controller to transfer data directly between the remote storage device and a memory of the host using zero-copy.

14 Claims, 4 Drawing Sheets

(51) Int. Cl.
*H04L 1/00* (2006.01)
*H04L 1/1867* (2023.01)

(52) U.S. Cl.
CPC .......... *G06F 3/0659* (2013.01); *G06F 3/0679* (2013.01); *H04L 1/0041* (2013.01); *H04L 1/0045* (2013.01); *H04L 1/189* (2013.01)

(56) References Cited

U.S. PATENT DOCUMENTS

| | | | |
|---|---|---|---|
| 5,768,612 | A | 6/1998 | Nelson |
| 5,864,876 | A | 1/1999 | Rossum et al. |
| 5,893,166 | A | 4/1999 | Frank et al. |
| 5,954,802 | A | 9/1999 | Griffith |
| 6,070,219 | A | 5/2000 | McAlpine et al. |
| 6,321,276 | B1 | 11/2001 | Forin |
| 6,581,130 | B1 | 6/2003 | Brinkmann et al. |
| 6,701,405 | B1 | 3/2004 | Adusumilli et al. |
| 6,766,467 | B1 | 7/2004 | Neal et al. |
| 6,789,143 | B2 | 9/2004 | Craddock et al. |
| 6,981,027 | B1 | 12/2005 | Gallo et al. |
| 7,171,484 | B1 | 1/2007 | Krause et al. |
| 7,225,277 | B2 | 5/2007 | Johns et al. |
| 7,263,103 | B2 | 8/2007 | Kagan et al. |
| 7,299,266 | B2 | 11/2007 | Boyd et al. |
| 7,395,364 | B2 | 7/2008 | Higuchi et al. |
| 7,464,198 | B2 | 12/2008 | Martinez et al. |
| 7,475,398 | B2 | 1/2009 | Nunoe |
| 7,548,999 | B2 | 6/2009 | Haertel et al. |
| 7,577,773 | B1 | 8/2009 | Gandhi et al. |
| 7,752,417 | B2 | 7/2010 | Manczak et al. |
| 7,809,923 | B2 | 10/2010 | Hummel et al. |
| 7,921,178 | B2 | 4/2011 | Haviv |
| 7,921,237 | B1* | 4/2011 | Holland .................. G06F 13/28 710/28 |
| 7,945,752 | B1 | 5/2011 | Miller et al. |
| 3,001,592 | A1 | 8/2011 | Hatakeyama |
| 8,010,763 | B2 | 8/2011 | Armstrong et al. |
| 3,051,212 | A1 | 11/2011 | Kagan et al. |
| 8,255,475 | B2 | 8/2012 | Kagan et al. |
| 8,260,980 | B2 | 9/2012 | Weber et al. |
| 8,447,904 | B2 | 5/2013 | Riddoch |
| 8,504,780 | B2 | 8/2013 | Mine et al. |
| 8,645,663 | B2 | 2/2014 | Kagan et al. |
| 8,745,276 | B2 | 6/2014 | Bloch et al. |
| 8,751,701 | B2 | 6/2014 | Shahar et al. |
| 8,949,486 | B1 | 2/2015 | Kagan et al. |
| 9,092,426 | B1* | 7/2015 | Bathija ................ G06F 12/1081 |
| 9,298,723 | B1 | 3/2016 | Vincent |
| 9,696,942 | B2* | 7/2017 | Kagan ................... G06F 3/0607 |
| 9,727,503 | B2 | 8/2017 | Kagan et al. |
| 10,657,077 | B2 | 5/2020 | Ganor et al. |
| 10,684,973 | B2* | 6/2020 | Connor ............... G06F 13/4022 |
| 10,999,364 | B1 | 5/2021 | Itigin et al. |
| 11,086,713 | B1* | 8/2021 | Sapuntzakis .......... G06F 3/0673 |
| 2002/0152327 | A1 | 10/2002 | Kagan et al. |
| 2003/0046530 | A1 | 3/2003 | Poznanovic |
| 2003/0120836 | A1* | 6/2003 | Gordon .................. G06F 13/28 710/22 |
| 2004/0221128 | A1 | 11/2004 | Beecroft et al. |
| 2004/0230979 | A1 | 11/2004 | Beecroft et al. |
| 2005/0216552 | A1 | 9/2005 | Fineberg et al. |
| 2006/0259661 | A1 | 11/2006 | Feng et al. |
| 2007/0011429 | A1 | 1/2007 | Sangili et al. |
| 2007/0061492 | A1* | 3/2007 | van Riel .................. H04L 69/22 710/3 |
| 2007/0223472 | A1 | 9/2007 | Tachibana ............... H04L 47/10 370/473 |
| 2007/0226450 | A1 | 9/2007 | Engbersen et al. |
| 2007/0283124 | A1 | 12/2007 | Menczak et al. |
| 2007/0297453 | A1* | 12/2007 | Niinomi .................. H04L 47/10 370/474 |
| 2008/0005387 | A1 | 1/2008 | Mutaguchi |
| 2008/0147904 | A1 | 6/2008 | Freimuth et al. |
| 2008/0168479 | A1 | 7/2008 | Purtell et al. |
| 2008/0313364 | A1 | 12/2008 | Flynn et al. |
| 2010/0030975 | A1 | 2/2010 | Murray et al. |
| 2010/0095053 | A1 | 4/2010 | Bruce et al. |
| 2010/0095085 | A1 | 4/2010 | Hummel et al. |
| 2010/0211834 | A1* | 8/2010 | Asnaashari ......... G06F 11/1004 714/763 |
| 2010/0217916 | A1 | 8/2010 | Gao et al. |
| 2011/0023027 | A1 | 1/2011 | Kegel et al. |
| 2011/0213854 | A1 | 9/2011 | Haviv |
| 2011/0246597 | A1 | 10/2011 | Swanson et al. |
| 2013/0067193 | A1 | 3/2013 | Kagan et al. |
| 2013/0103777 | A1 | 4/2013 | Kagan et al. |
| 2013/0311746 | A1 | 11/2013 | Raindel et al. |
| 2013/0325998 | A1 | 12/2013 | Hormuth et al. |
| 2014/0089450 | A1 | 3/2014 | Raindel et al. |
| 2014/0089451 | A1 | 3/2014 | Eran et al. |
| 2014/0089631 | A1 | 3/2014 | King |
| 2014/0122828 | A1 | 5/2014 | Kagan et al. |
| 2014/0156894 | A1 | 6/2014 | Tsirkin et al. |
| 2014/0181365 | A1 | 6/2014 | Fanning et al. |
| 2015/0006663 | A1 | 1/2015 | Huang |
| 2015/0012735 | A1 | 1/2015 | Tamir et al. |
| 2015/0032835 | A1* | 1/2015 | Sharp .................. H04L 67/1097 709/212 |
| 2015/0081947 | A1 | 3/2015 | Vucinic et al. |
| 2015/0319243 | A1 | 11/2015 | Hussain et al. |
| 2017/0187629 | A1* | 6/2017 | Shalev ................ H04L 43/0823 |
| 2019/0199690 | A1 | 6/2019 | Klein |
| 2020/0065269 | A1* | 2/2020 | Balasubramani ... G06F 13/1668 |
| 2022/0075747 | A1 | 3/2022 | Shuler et al. |
| 2022/0100687 | A1* | 3/2022 | Sahin .................... G06F 3/0635 |

OTHER PUBLICATIONS

"Linux kernel enable the IOMMU—input/output memory management unit support", pp. 1-2, Oct. 15, 2007 downloaded from http://www.cyberciti.biz/tips/howto-turn-on-linux-software-iommu-support.html.
Hummel M., "IO Memory Management Hardware Goes Mainstream", AMD Fellow, Computation Products Group, Microsoft WinHEC, pp. 1-7, 2006.
PCI Express, Base Specification, Revision 3.0, pp. 1-860, Nov. 10, 2010.
NVM Express, Revision 1.0e, pp. 1-127, Jan. 23, 2014.
Infiniband Trade Association, "InfiniBandTM Architecture Specification", vol. 1, Release 1.2.1, pp. 1-1727, Nov. 2007.
Shah et al., "Direct Data Placement over Reliable Transports", IETF Network Working Group, RFC 5041, pp. 1-38, Oct. 2007.
Culley et al., "Marker PDU Aligned Framing for TCP Specification", IETF Network Working Group, RFC 5044, pp. 1-75, Oct. 2007.
"MPI: A Message-Passing Interface Standard", Version 2.2, Message Passing Interface Forum, pp. 1-64, Sep. 4, 2009.
Welsh et al., "Incorporating Memory Management into User-Level Network Interfaces", Department of Computer Science, Cornell University, Technical Report TR97-1620, pp. 1-10, Feb. 13, 1997.
Tsirkin et al., "Virtual I/O Device (Virtio) Version 1.1", Committee Specification 01, Oasis, Section 5.11, pp. 156-160, Apr. 11, 2019.
Burstein et al., U.S. Appl. No. 17/189,303, filed Mar. 2, 2021.
Mellanox Technologies, "Understanding On Demand Paging (ODP)," Knowledge Article, pp. 1-6, Feb. 20, 2019 downloaded from https://community.mellanox.com/s/article/understanding-on-demand-paging--odp-x.
Rosenbaum et al., U.S. Appl. No. 17/338,131, filed Jun. 3, 2021.
Duer et al., U.S. Appl. No. 17/211,928, filed Mar. 25, 2021.
Microchip Technology Incorporated, "Switchtec PAX Gen 4 Advanced Fabric PCIe Switch Family—PM42100, PM42068, PM42052, PM42036, PM42028," Product Brochure, pp. 1-2, year 2021.
Regula, "Using Non-Transparent Bridging in PCI Express Systems," PLX Technology, Inc., pp. 1-31, Jun. 2004.
U.S. Appl. No. 17/211,928 Office Action dated May 25, 2023.

* cited by examiner

NETWORK ADAPTER WITH EFFICIENT STORAGE-PROTOCOL EMULATION

FIELD OF THE INVENTION

The present invention relates generally to data storage, and particularly to methods and systems for emulation of remote storage.

BACKGROUND OF THE INVENTION

Various techniques for data storage using network adapters are known in the art. For example, U.S. Pat. Nos. 9,696,942 and 9,727,503 describe techniques for accessing remote storage devices using a local bus protocol. A disclosed method includes configuring a driver program on a host computer to receive commands in accordance with a protocol defined for accessing local storage devices connected to a peripheral component interface bus of the host computer. When the driver program receives, from an application program running on the host computer a storage access command in accordance with the protocol, specifying a storage transaction, a remote direct memory access (RDMA) operation is performed by a network interface controller (NIC) connected to the host computer so as to execute the storage transaction via a network on a remote storage device.

U.S. Pat. No. 10,657,077 describes a HyperConverged NVMF storage-NIC card. A storage and communication apparatus for plugging into a server, includes a circuit board, a bus interface, a Medium Access Control (MAC) processor, one or more storage devices and at least one Central Processing Unit (CPU). The bus interface is configured to connect the apparatus at least to a processor of the server. The MAC is mounted on the circuit board and is configured to connect to a communication network. The storage devices are mounted on the circuit board and are configured to store data. The CPU is mounted on the circuit board and is configured to expose the storage devices both (i) to the processor of the server via the bus interface, and (ii) indirectly to other servers over the communication network.

SUMMARY OF THE INVENTION

An embodiment of the present invention that is described herein provides a network adapter including a network interface controller and a processor. The network interface controller is to communicate over a peripheral bus with a host, and over a network with a remote storage device. The processor is to expose on the peripheral bus a peripheral-bus device that communicates with the host using a bus storage protocol, to receive first Input/Output (I/O) transactions of the bus storage protocol from the host, via the exposed peripheral-bus device, and to complete the first I/O transactions for the host in the remote storage device by (i) translating between the first I/O transactions of the bus storage protocol and second I/O transactions of a network storage protocol, and (ii) executing the second I/O transactions in the remote storage device. For receiving and completing the first I/O transactions, the processor is to cause the network interface controller to transfer data of the first and second I/O transactions directly between the remote storage device and a memory of the host using zero-copy transfer.

In an embodiment, the bus storage protocol is Non Volatile Memory express (NVMe), and the network storage protocol is NVMe over Transmission Control Protocol (NVMe-over-TCP). In a disclosed embodiment, the processor is to process and exchange packet headers of the network storage protocol with the remote storage device, while the network interface controller exchanges the data directly between the remote storage device and the memory of the host. In an example embodiment, to cause the network interface controller to transfer the data directly, the processor is to map a memory buffer in the memory of the host to Direct Memory Access (DMA) addresses in the network interface controller.

In another embodiment, upon a failure to transfer a packet of the network storage protocol to the remote storage device, the processor is to retrieve the data of the packet from the memory of the host, and to retransmit the packet with the retrieved data. In yet another embodiment, in transferring the data directly from the memory of the host to the remote storage device, the network interface controller is to calculate a Cyclic Redundancy Check (CRC) over the transferred data and to transfer the CRC with the data.

In some embodiments, in transferring the data directly from the remote storage device to the memory of the host, the network interface controller is to verify a Cyclic Redundancy Check (CRC) that is received with the data. In an example embodiment, upon failing to verify the CRC, the network interface controller is to trigger the processor to verify the CRC, and the processor is to retrieve at least some of the data from the memory of the host and to verify the CRC using the retrieved data.

There is additionally provided, in accordance with an embodiment of the present invention, a method in a network adapter that includes a network interface controller and a processor. The method includes, using the network interface controller of the network adapter, communicating over a peripheral bus with a host, and over a network with a remote storage device. Using the processor of the network adapter, (i) a peripheral-bus device, which communicates with the host using a bus storage protocol, is exposed on the peripheral bus, (ii) first Input/Output (I/O) transactions of the bus storage protocol are received from the host via the exposed peripheral-bus device, and (iii) the first I/O transactions are completed for the host in the remote storage device by (a) translating between the first I/O transactions of the bus storage protocol and second I/O transactions of a network storage protocol, and (b) executing the second I/O transactions in the remote storage device. Receiving and completing the first I/O transactions includes causing the network interface controller to transfer data of the first and second I/O transactions directly between the remote storage device and a memory of the host using zero-copy transfer.

There is further provided, in accordance with an embodiment of the present invention, a method for executing Input/Output (I/O) transactions for a host in a remote storage device using a network adapter. The method includes, using a network interface controller in the network adapter, communicating with the host over a peripheral bus, and communicating with the remote storage device over a network. Using a processor in the network adapter, I/O transactions of a bus storage protocol are received from the host, and the I/O transactions are completed for the host in the remote storage device by translating between the bus storage protocol and a network storage protocol. Receiving and completing the I/O transactions includes causing the network interface controller to transfer data of the I/O transactions directly between the remote storage device and a memory of the host using zero-copy transfer.

The present invention will be more fully understood from the following detailed description of the embodiments thereof, taken together with the drawings in which:

DETAILED DESCRIPTION OF EMBODIMENTS

Overview

Figure 1:
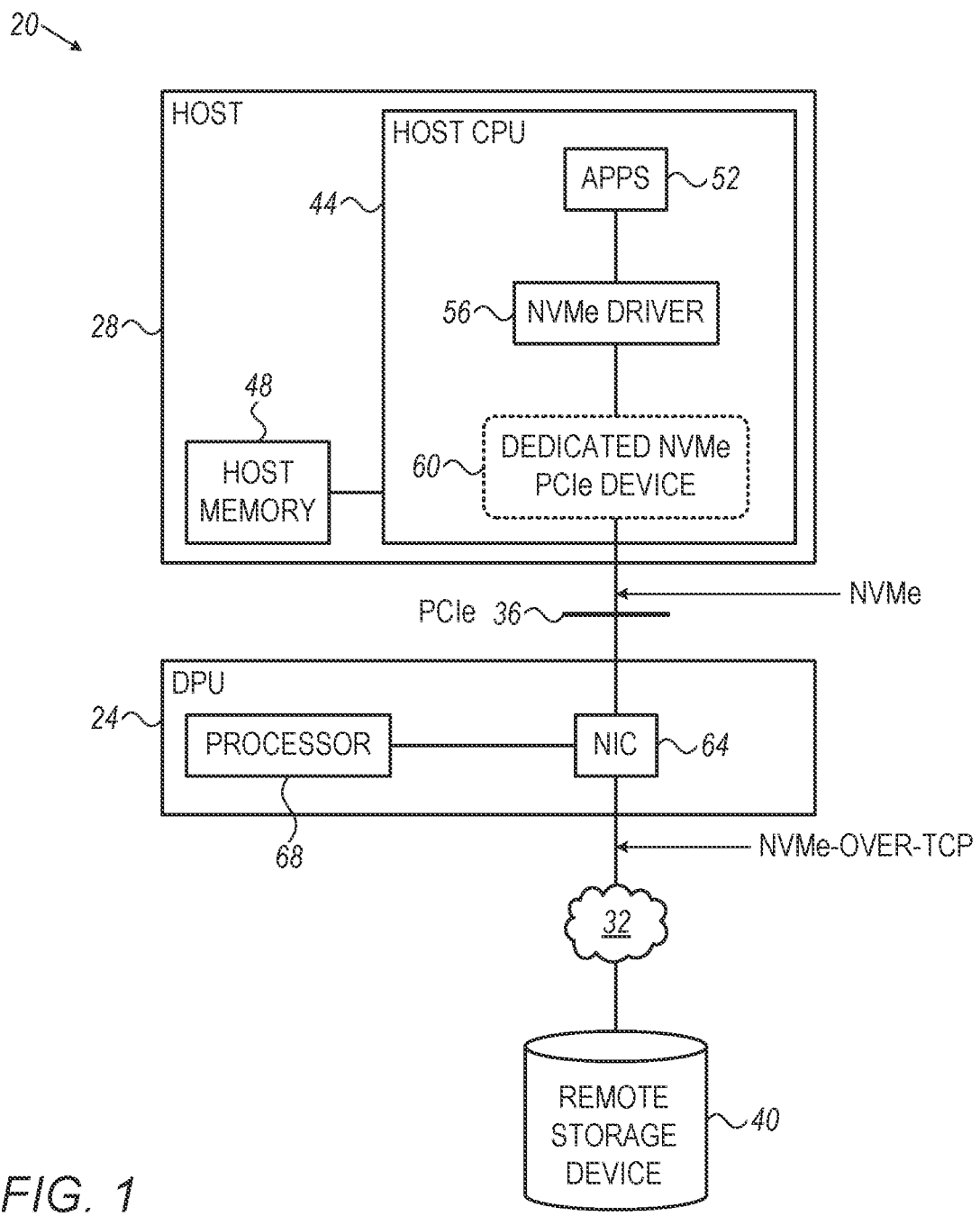
FIG. 1 is a block diagram that schematically illustrates a computing and storage system, in accordance with an embodiment of the present invention.

Embodiments of the present invention that are described herein provide improved data storage techniques, in which a network adapter stores and retrieves data for a host in a remote storage device. The network adapter communicates with the host over a peripheral bus, e.g., a Peripheral Component interconnect express (PCIe) bus, and with the remote storage device over a network.

In the disclosed embodiments, the network adapter "emulates" a bus storage protocol (e.g., Non Volatile Memory express—NVMe) toward the host, and at the same time stores and retrieves data in the remote storage device using a network storage protocol (e.g., NVMe over Transmission Control Protocol—NVMe-over-TCP). The description that follows will refer mainly to the NVMe and NVMe-over-TCP protocols, by way of example.

The term "emulation" means that from the perspective of the host, the network adapter appears and behaves as a local storage device, e.g., as an NVMe disk connected to the host's PCIe bus. In reality, however, the network adapter receives NVMe commands from the host, translates the NVMe commands into NVMe-over-TCP commands, and executes the NVMe-over-TCP commands in the remote storage device. (The terms "commands" and "I/O transactions" or simply "transactions" are used interchangeably herein.)

In some embodiments, the network adapter is a Data Processing Unit (DPU) that comprises a Network Interface Controller (NIC) and a powerful processor (also referred to herein as "DPU processor" for clarity). In an example embodiment, the processor comprises an array of ARM cores.

In some embodiments, the DPU processor exposes to the host, over the PCIe bus, a dedicated PCIe device that emulates the NVMe protocol. The host issues NVMe commands, e.g., read and/or write commands, and sends them to the dedicated PCIe device, similarly to the way the host would issue NVMe commands to a local disk. The DPU processor receives the NVMe commands from the host via the dedicated PCIe device, and completes the NVMe commands for the host by (i) translating between the NVMe commands and NVMe-over-TCP commands, and (ii) executing the NVMe-over-TCP commands in the remote storage device.

As will be explained in detail below, the NIC in the DPU transfers the data of the NVMe and NVMe-over-TCP transactions directly between the remote storage device and a memory of the host, using zero-copy transfer. In the present context, the term "zero-copy" means that the data is transferred directly between the memory of the host and the remote storage device, without intermediate storage in the DPU. Zero-copy data transfer significantly reduces the overall transaction latency, and increases the achievable throughput. Example techniques of this sort are described in U.S. patent application Ser. No. 17/338,131, entitled "Cross Bus Memory Mapping," filed Jun. 3, 2021, whose disclosure is incorporated herein by reference.

In some embodiments, the DPU processor enables the NIC to perform such direct, zero-copy data transfer by mapping a memory buffer in the host memory to corresponding Direct Memory Access (DMA) addresses of the NIC. Once the mapping is in place, the NIC is able to access the memory of host directly, using the host's own address space. Techniques of this sort are described in U.S. patent application Ser. No. 17/189,303, entitled "Cross Address-Space Bridging," filed Mar. 2, 2021, whose disclosure is incorporated herein by reference.

In some embodiments, the DPU processor runs a TCP protocol stack and establishes a TCP connection with the remote storage device. The DPU then executes the NVMe-over-TCP transactions by exchanging TCP packets with the remote storage device over the TCP connection. Internally in the DPU, the NIC transfers packet data and packet headers over different paths. The data is transferred directly by the NIC to/from the host memory, using zero-copy transfer as noted above. The packet headers are transferred by the NIC to/from the DPU processor, for terminating and otherwise handling the TCP connection. This technique obviates the need to copy packet data between the NIC and the DPU processor, thereby reducing latency and improving throughput.

When using the disclosed configuration, the data of the I/O transactions does not normally pass through the DPU processor. Therefore, in some embodiments the NIC is responsible for calculating and verifying Cyclic Redundancy Check codes ("CRCs"), which are data dependent. On transmission, the NIC typically calculates CRCs over the data, and sends the data and corresponding CRCs to the remote storage device. On reception, the NIC typically receives data and corresponding CRCs from the remote storage device, calculates CRCs over the received data, and verifies that the calculated CRCs match the received CRCs.

Several example implementations of the disclosed techniques are described herein. Complementary techniques, such as fallback schemes in which the DPU processor does gain access to the data of the I/O transactions, are also described. Such fallback schemes are used, for example, for implementing TCP retransmission and for recovering from CRC failure due to out-of-order packet arrival.

System Description

FIG. 1 is a block diagram that schematically illustrates a computing and storage system 20, in accordance with an embodiment of the present invention. System 20 comprises a high-performance network adapter 24, also referred to as a Data Processing Unit (DPU), which serves a host 28. DPU 24 communicates with host 28 over a peripheral bus, in the present example a Peripheral Component Interconnect express (PCIe) bus 36.

DPU 24 provides host 28 with data storage services, possibly among other tasks, e.g., in addition to conventional networking services. In the example of FIG. 1, DPU 24 connects host 28 to a network 32, and stores and retrieves data for host 28 over network 32 in a remote storage device 40.

In the present example, host 28 comprises a host CPU 44 and a memory 48. Host CPU 44 may run various software applications ("apps") 52 depending on the applicable use-case. Among other tasks, applications 52 issue Input/Output (I/O) transactions, e.g., transactions that write data to files or objects, read data from files or objects, or create, modify or delete files, directories, objects and the like. Generally, I/O transactions can be issued by any software that runs on host CPU 44, e.g., by Virtual Machines (VMs), processes, containers, by the host's operating system, or by any other software.

In the embodiment of FIG. 1, host CPU 44 runs an NVMe driver 56 that provides data storage services to the various types of software running on the host CPU, e.g., to applications 52. Driver 56 stores and retrieves data for applications 52 by issuing NVMe commands to one or more NVMe devices that may be connected to PCIe bus 36. In particular, driver 56 issues NVMe commands to a dedicated NVMe PCIe device 60 that is exposed by DPU 24, as will be explained below.

For the sake of clarity, PCIe device 60 is depicted in the figure inside host 28, in order to emphasize the interaction between device 60 and host CPU 44. In reality, however, PCIe device 60 is a logical interface presented to host 28 by DPU 24 over bus 36. The terms "PCIe device" and "PCIe interface" can therefore be used interchangeably. PCIe device 60 may comprise a PCIe physical function or virtual function. Interaction between host CPU 44 and PCIe device 60 may be implemented using standard operating-system (OS) drivers, or as a vendor specific driver, as appropriate.

As seen in FIG. 1, DPU 24 comprises a Network Interface Controller (NIC) 64 and a DPU processor 68. In an example embodiment, NIC 64 is implemented using an Application-Specific Integrated Circuit (ASIC), and DPU processor 68 comprises multiple interconnected ARM processing cores that run suitable software. Alternatively, however, any other suitable implementation can be used.

In some embodiments, DPU 24 emulates the NVMe storage protocol toward host 28. For actual execution of the I/O transactions, however, DPU 24 communicates with remote storage device 40 over network 32, using NVMe-over-TCP. The operation of DPU 24 is explained in detail below. Generally speaking, NIC 64 transfers the data of the NVMe and NVMe-over-TCP transactions directly between remote storage device 40 and host memory 48, using zero-copy transfer. DPU processor 68 enables (or causes) NIC 64 to perform this zero-copy data transfer by mapping a memory buffer in host memory 48 to corresponding DMA addresses of NIC 64. The mapping enables NIC 64 to read and write packet data directly in the host memory, using the address space of the host.

The configurations of system 20 and its components, e.g., DPU 24 and host 28, shown in FIG. 1, are example configurations that are depicted purely for the sake of conceptual clarity. Any other suitable configurations can be used in alternative embodiments. The various elements of system 20 and its components, e.g., DPU 24 and host 28, may be implemented using software, using suitable hardware such as in one or more Application-Specific Integrated Circuits (ASIC) or Field-Programmable Gate Arrays (FPGA), or using a combination of software and hardware elements.

Typically, host CPU 44 and DPU processor 68 comprise programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Storage Emulation without Data Copying Between
NIC and DPU Processor

As noted above, DPU 24 receives NVMe commands from host 28 via PCIe device 60, translates the NVMe commands into NVMe-over-TCP commands, and executes the NVMe-over-TCP commands in remote storage device 40. In some embodiments, NIC 64 transfers packet data (as opposed to headers and/or other metadata, as appropriate) directly between host 28 and remote storage device 40. During normal operation, packet data does not pass through DPU processor 68, and therefore there is no need to copy or otherwise transfer the data between NIC 64 and DPU processor 68. This solution provides a considerable reduction in latency, both on transmission (e.g., writing data from the host to the remote storage device) and on reception (e.g., reading data from the remote storage device to the host).

Figure 2:
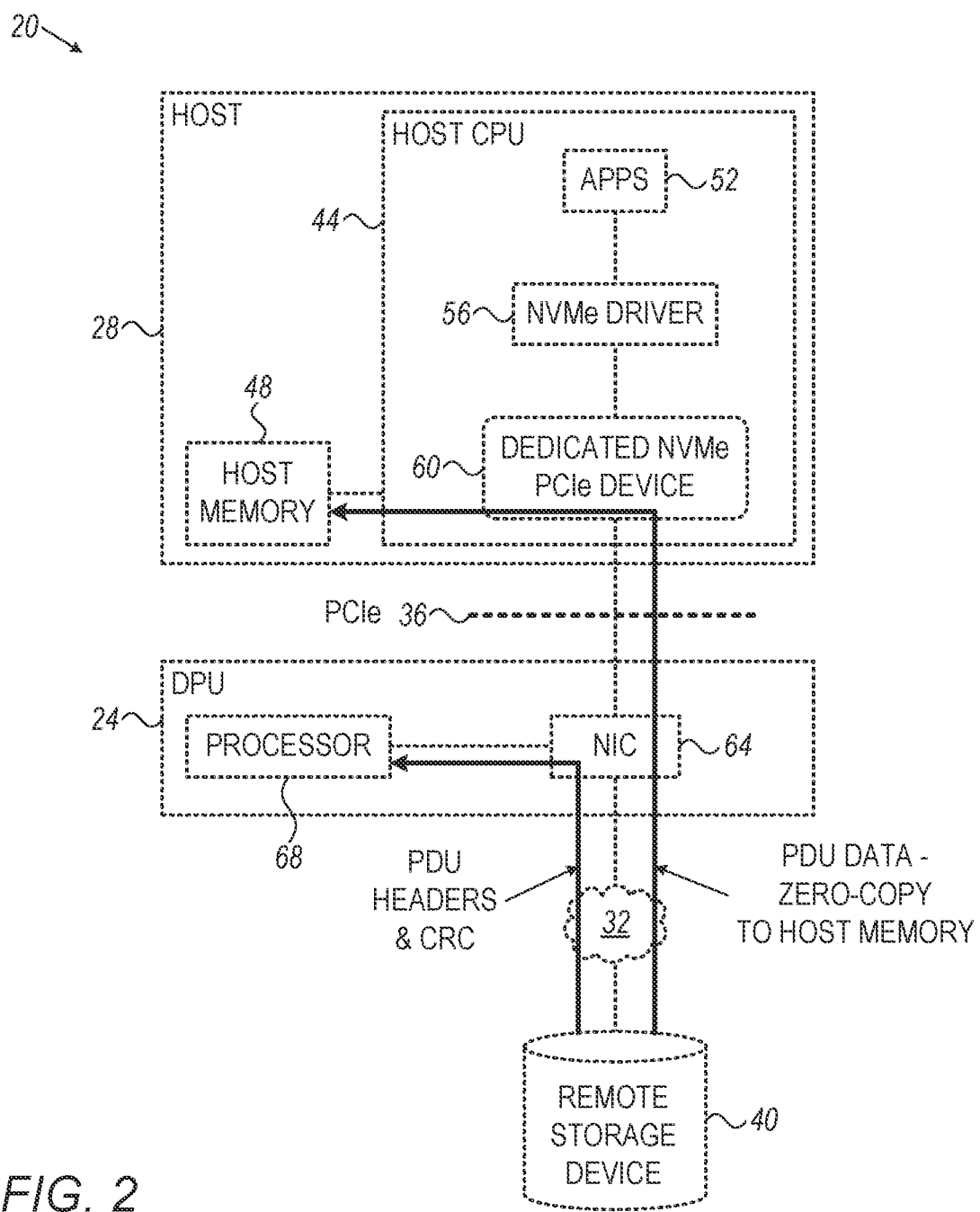
FIG. 2 is a diagram that schematically illustrates emulation of a read command in the system of FIG. 1, in accordance with an embodiment of the present invention.
Figure 4:
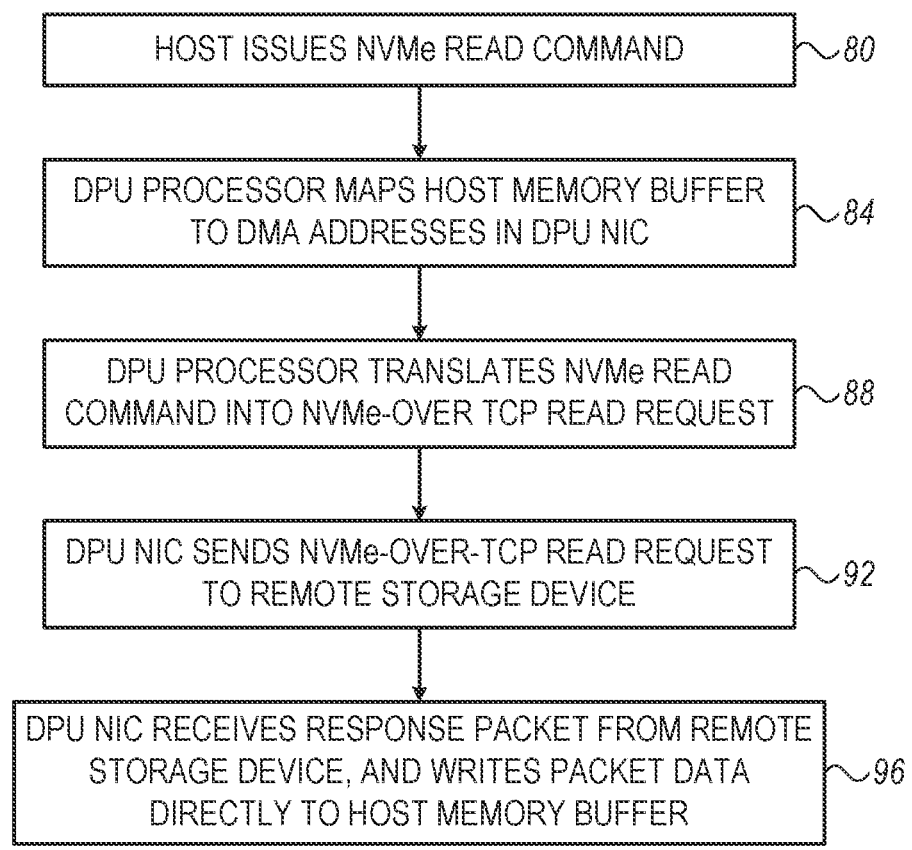
FIG. 4 is a flow chart that schematically illustrates a method for executing a read command in the system of FIG. 1, in accordance with an embodiment of the present invention.

FIG. 2 is a diagram that schematically illustrates emulation of a read command in system 20, in accordance with an embodiment of the present invention. The figure focuses on a specific stage of execution of the read command—Transferring the requested data from remote storage device 40 via DPU 24 to host 28. A complete description of the read process, including preceding stages, is depicted in FIG. 4 below.

In accordance with NVMe-over-TCP, remote storage device 40 sends the requested data to DPU 24 in one or more TCP Protocol Data Units (PDUs). (The terms PDU and packet are sometimes used interchangeably herein.) Each PDU comprises a packet header and packet data. In addition, remote storage device 40 produces and sends CRC packets, each CRC packet comprising a CRC code calculated over one or more PDUs.

The paths traversed by the PDU data, the PDU headers and the CRC packets are illustrated using bold arrows in FIG. 2. As seen, the PDU data is received by NIC 64 and transferred directly to host memory 48, without passing through DPU processor 68. The PDU headers and CRC packets are received by NIC 64 and transferred to DPU processor 68.

DPU processor 68 typically runs a TCP protocol stack and serves as a TCP endpoint of the TCP connection between DPU 24 and remote storage device 40. As part of running the protocol stack, DPU processor 68 terminates the TCP connection, maintains the state of the TCP connection by running a suitable state machine, etc. For performing these tasks, it is sufficient for DPU processor 68 to receive the PDU headers and CRC, and not the PDU data.

Figure 3:
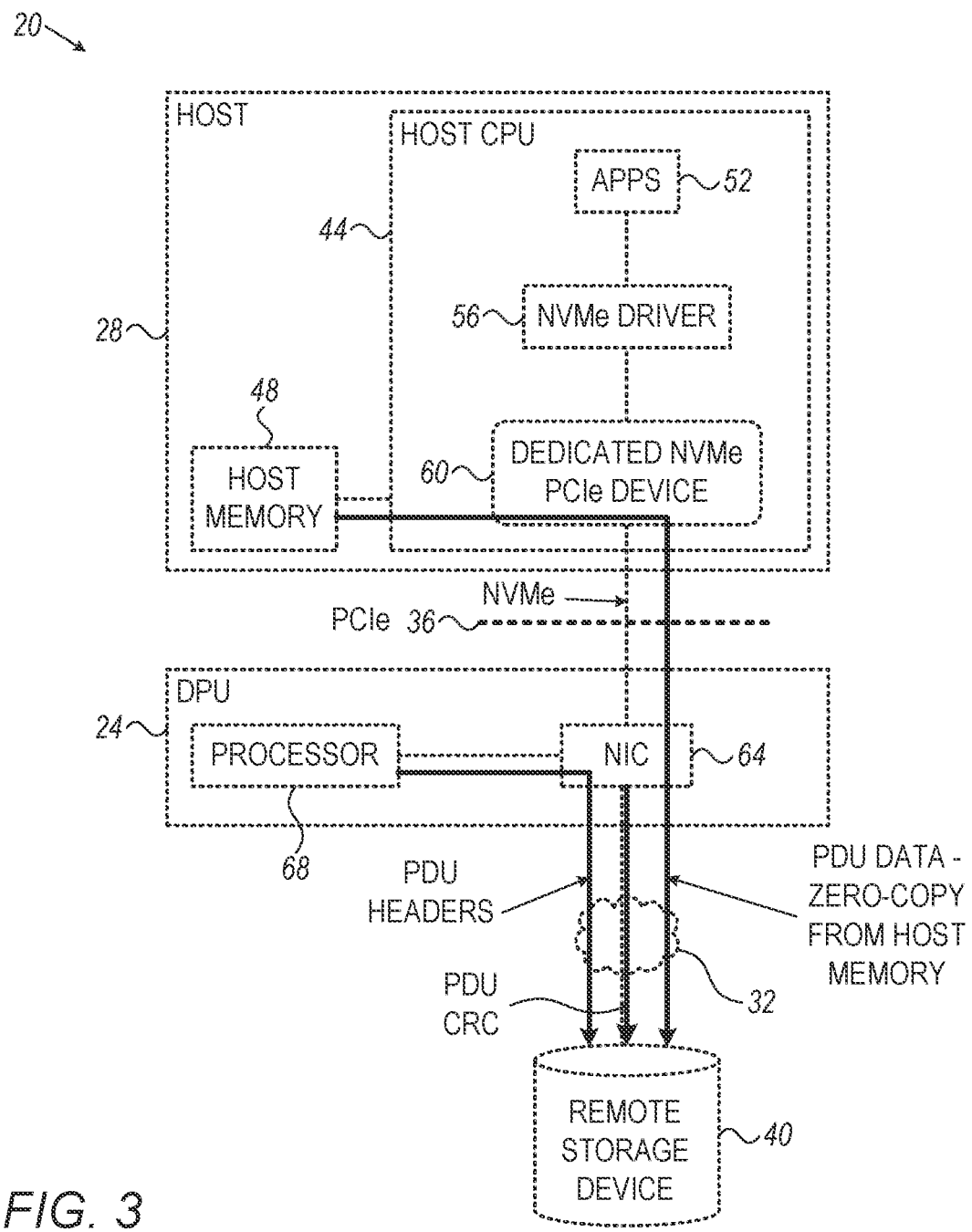
FIG. 3 is a diagram that schematically illustrates emulation of a write command in the system of FIG. 1, in accordance with an embodiment of the present invention.

FIG. 3 is a diagram that schematically illustrates emulation of a write command in system 20, in accordance with an embodiment of the present invention. Here, too, the figure focuses on a specific stage of execution of the write command—Transferring the data for storage from host 28 via DPU 24 to remote storage device 40.

In the example of FIG. 3, DPU 24 sends the data to remote storage device 40 in one or more TCP PDUs. Each PDU comprises a packet header and packet data. In addition, DPU 24 produces and sends CRC packets, each CRC packet comprising a CRC code calculated over one or more PDUs.

Bold arrows in FIG. 3 show the different paths traversed by the PDU data, the PDU headers and the CRC packets. As seen, the PDU data is transferred by NIC 64 directly from host memory 48 to remote storage device 40. The PDU headers are transferred by NIC 64 from DPU processor 68 to remote storage device 40. The CRC packets are produced in NIC 64 and sent to remote storage device 40.

The examples of FIGS. 2 and 3 demonstrate that, in executing read and write commands using the disclosed techniques, PDU data does not pass through DPU processor 68. As such, data copy operations between NIC 64 and DPU processor 68 are eliminated.

FIG. 4 is a flow chart that schematically illustrates a method for executing a read command in the system of FIG. 1, in accordance with an embodiment of the present invention. The method begins with host CPU 44 issuing an NVMe read command, at a command issuance stage 80. Typically, the NVMe command is sent by NVMe driver 56 to NVMe PCIe device 60 (FIG. 1). The command typically specifies (i) addresses (in an address space of an NVMe device that is emulated by DPU 24) from which the requested data is to be read, and (ii) addresses of a memory buffer in host memory 48 into which the data is to be fetched.

At a mapping stage 84, DPU processor 68 maps the addresses of the host memory buffer, which were specified in the NVMe read command, to respective Direct Memory Access (DMA) addresses of DPU NIC 64. This mapping enables DPU NIC 64 to write data directly into the appropriate buffer in host memory 48, using the address space of host CPU 44 itself. In some embodiments, DPU processor 68 maps physical addresses of the memory buffer in host memory 48 to DMA addresses of DPU NIC 64. The mapping may be predefined, or performed on-demand using a mechanism such as NIC On-Demand-Paging. In this manner, DPU processor 68 is able to instruct DPU NIC 64 to write the retrieved data to the appropriate physical addresses in host memory 44.

At a protocol translation stage 88, DPU processor 68 translates the NVMe read command into an NVMe-over-TCP read request. The translation is typically a one-to-one translation, i.e., a given NVMe read command is translated into a respective NVMe-over-TCP read request, but the disclosed techniques are in no way limited to one-to-one translation. At a request sending stage 92, DPU NIC 64 sends the NVME-over-TCP read request to remote storage device 40 over network 32.

At a response processing stage 96, DPU NIC 64 receives a response packet from remote storage device 40, in response to the NVME-over-TCP read request. The response packet comprises, inter alia, the requested data. DPU NIC 64 writes the data directly to the appropriate addresses in host memory 48 (to the addresses mapped at stage 84). Neither host CPU 44 nor DPU processor 44 are involved in this direct transfer of data.

The method flow of FIG. 4 is an example flow that is depicted purely for the sake of conceptual clarity. In alternative embodiments, the disclosed techniques can be carried out using any other suitable flow.

For example, an NVMe write command can be processed by DPU 24 in a similar manner. In the case of a write command, the command specifies (i) a host memory buffer that holds the data to be written, and (ii) addresses (in an address space of an NVMe device that is emulated by DPU 24) in which the data is to be written. DPU processor 68 maps the host memory buffer to respective DMA addresses of DPU NIC 64. Using this mapping, DPU NIC 64 is able to write the data directly from the host memory buffer to remote storage device 40. In processing the NVMe write command, DPU processor 68 translates the NVMe write command into an NVMe-over-TCP write request. The NVMe-over-TCP write request conveys the data to be written. DPU NIC 64 writes the data from the host memory buffer to the remote storage device by sending this write request over network 32.

Typically, in carrying out the flow of FIG. 4, or the NVME write command flow given above, DPU 24 uses different paths for packet data and packet headers as described in FIGS. 2 and 3.

Offloading of CRC Operations

As explained at length herein, when DPU 24 transfers data between host 28 and remote storage device 40, the data passes via DPU NIC 64 and normally does not reach DPU processor 68. Therefore, in some embodiments, Cyclic Redundancy Check (CRC) calculation and verification (which by-definition depend on the data) are performed by NIC 64. This solution avoids transfer of data from NIC 64 to DPU processor 68 for the sake of CRC operations, and the resulting degradation in latency and throughput.

In an embodiment, NIC 64 calculates CRCs when completing write commands for host 28 in remote storage device 40. Typically, (see FIG. 3) NIC 64 receives the data of the write command from host 28, and PDU headers from DPU processor 68. NIC 64 composes NVMe-over-TCP packets from the data and the headers, calculates CRC over the data of a group of packets, and sends the NVMe-over-TCP packets to the remote storage device.

Additionally or alternatively, NIC 64 verifies the correctness of CRCs that are received from the remote storage device, as part of completing read commands. Typically (see FIG. 2), NIC 64 receives NVMe-over-TCP packets from remote storage device 40. The NVMe-over-TCP packets comprise PDU data, PDU headers and CRCs that were calculated by the remote storage device over the PDU data. NIC 64 calculates CRCs over the received data, and verifies that the calculated CRCs match the received CRCs.

A mismatch between a received CRC and a corresponding calculated CRC (a CRC calculated by the NIC over the received data) is indicative of a reception error, or in some cases of packets that arrive out-of-order. Typically, upon detecting a CRC mismatch ("CRC failure"), NIC 64 issues an error message to DPU processor 68.

Fallback Scenarios with Data Access by DPU Processor

In the embodiments described herein, the PDU data does not reach DPU processor 68 during normal processing of read and write commands. This feature provides considerable improvement in throughput and latency because there is no need to copy large amounts of data within DPU 24, between NIC 64 and processor 68. In some abnormal scenarios, however, DPU processor 68 does gain access to at least some of the data, at least temporarily. This access is needed, for example, for performing actions at the TCP level that depend on the data. Such actions are relatively rare, and therefore the incurred latency is acceptable.

Mitigating CRC Failure Due to Out-Of-Order Packet Arrival

One example scenario of this sort relates to CRC failure due to packets that arrive out-of-order. Consider a scenario in which DPU 24 receives a sequence of NVMe-over-TCP packets, and further receives a CRC that was calculated over the sequence. For some reason, however, some of the packets in the sequence arrive out-of-order, i.e., in an order that is different from the order in which the remote storage device sent them. Such an event will cause CRC mismatch at NIC 64 (because the NIC calculates the CRC according to the packet order-of-arrival, whereas the remote storage device calculated the CRC according to the packet order-of-transmission).

In principle, it is possible for DPU 24 to simply regard the entire sequence of packets as failed. This solution, however, is extremely wasteful and requires extensive retransmission of data. Moreover, CRC failure typically requires full NVME-over-TCP reconnection, and not only retransmission. In some embodiments, DPU 24 mitigates this scenario without retransmission by having DPU processor 68 access the data in host memory 48. This solution exploits the fact that, in the host memory, the packet data is organized in-order, according to the packet sequence numbers, regardless of whether the packets arrived in-order or not. NIC 64, which operates on a packet-by-packet basis and is unaware of packet sequence numbers, does not have this order information.

Thus, in some embodiments, when identifying a CRC failure, NIC 64 triggers DPU processor 68 to attempt and resole the failure. DPU processor 68 accesses the data of the packet sequence in host memory 48, and recalculates the CRC over the data, but this time with knowledge that the data is organized in the correct order. If the CRC that is recalculated by the DPU processor matches the CRC that was received from the remote storage device, DPU processor 68 declares the CRC verification as successful, and the PDU data can be safely provided to the requesting application 52. If the CRC that is recalculated by the DPU processor still does not match the CRC that was received from the remote storage device, the DPU processor declares failure in resolving the CRC mismatch, and reverts to NVME-over-TCP reconnection and retransmission.

TCP Packet Retransmission

Another example scenario relates to TCP retransmission. Consider a scenario in which DPU 24 has transmitted a sequence of NVMe-over-TCP packets to remotes storage device 40, but a given packet was not received correctly at the remote storage device and needs to be retransmitted. The DPU may, for example, receive a NACK message indicating the packet that needs retransmission. Typically, NIC 64 cannot retransmit a packet autonomously, because (i) it does not possess the data of the packet that has failed, and (ii) retransmission requires not only transmitting the data again, but also reconstructing the state of the TCP connection at the time of transmitting the original packet.

In some embodiments, therefore, packet retransmission is performed by DPU processor 68 which, as explained above, runs the TCP protocol stack. In an embodiment, the DPU processor retrieves the PDU data of the packet from host memory 48, reconstructing the TCP connection state from its internally-run protocol stack, and then retransmits the packet with the correct state.

Although the embodiments described herein mainly address the NVMe and NVMe-over-TCP protocols, the methods and systems described herein can also be used with other bus storage protocols and that have network variants, e.g., iSCSI and iSCSI-over-TCP.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a network interface controller to communicate over a peripheral bus with a host and over a network with a remote storage device; and
a processor to:
expose on the peripheral bus a peripheral-bus device that communicates with the host using a bus storage protocol;
receive a first plurality of first Input/Output (I/O) transactions of the bus storage protocol from the host via the exposed peripheral-bus device; and
complete the first plurality of first I/O transactions for the host in the remote storage device by (i) translating between the first plurality of first I/O transactions of the bus storage protocol and a second plurality of second I/O transactions of a network storage protocol, and (ii) executing the second plurality of second I/O transactions in the remote storage device,
wherein the second plurality of second I/O transactions of the network storage protocol comprise packets having packet headers and packet data, and
wherein, for receiving and completing the first plurality of first I/O transactions, the network interface controller is to:
(i) transfer the packet data of the second plurality of second I/O transactions directly between the remote storage device and a memory of the host using zero-copy transfer; and
(ii) transfer the packet headers of the second plurality of second I/O transactions between the remote storage device and the processor.

2. The network adapter according to claim 1, wherein the bus storage protocol is Non Volatile Memory express (NVMe), and wherein the network storage protocol is NVMe over Transmission Control Protocol (NVMe-over-TCP).

3. The network adapter according to claim 1, wherein, to cause the network interface controller to transfer the packet data directly, the processor is to map a memory buffer in the memory of the host to Direct Memory Access (DMA) addresses in the network interface controller.

4. The network adapter according to claim 1, wherein, upon a failure to transfer a packet of the network storage protocol to the remote storage device, the processor is to retrieve the packet data of the packet from the memory of the host, and to retransmit the packet with the retrieved packet data.

5. The network adapter according to claim 1, wherein, in transferring the packet data directly from the memory of the host to the remote storage device, the network interface controller is to calculate a Cyclic Redundancy Check (CRC) over the transferred packet data and to transfer the CRC with the packet data.

6. The network adapter according to claim 1, wherein, in transferring the packet data directly from the remote storage device to the memory of the host, the network interface controller is to verify a Cyclic Redundancy Check (CRC) that is received with the packet data.

7. The network adapter according to claim 6, wherein, upon failing to verify the CRC, the network interface controller is to trigger the processor to verify the CRC, and the processor is to retrieve at least some of the packet data from the memory of the host and to verify the CRC using the retrieved packet data.

8. A method in a network adapter that includes a network interface controller and a processor, the method comprising:
 using the network interface controller of the network adapter, communicating over a peripheral bus with a host and over a network with a remote storage device; and
 using the processor of the network adapter, (i) exposing on the peripheral bus a peripheral-bus device that communicates with the host using a bus storage protocol, (ii) receiving a first plurality of first Input/Output (I/O) transactions of the bus storage protocol from the host via the exposed peripheral-bus device, and (iii) completing the first plurality of first I/O transactions for the host in the remote storage device by (a) translating between the first plurality of first I/O transactions of the bus storage protocol and a second plurality of second I/O transactions of a network storage protocol and (b) executing the second plurality of second I/O transactions in the remote storage device,
 wherein the second plurality of second I/O transactions of the network storage protocol comprise packets having packet headers and packet data, and
 wherein receiving and completing the first plurality of first I/O transactions comprises, using the network interface controller,
  (i) transferring the packet data of the second plurality of the second I/O transactions directly between the remote storage device and a memory of the host using zero-copy transfer; and
  (ii) transferring the packet headers of the second plurality of second I/O transactions between the remote storage device and the processor.

9. The method according to claim 8, wherein the bus storage protocol is Non Volatile Memory express (NVMe), and wherein the network storage protocol is NVMe over Transmission Control Protocol (NVMe-over-TCP).

10. The method according to claim 8, wherein transferring the data directly comprises mapping a memory buffer in the memory of the host to Direct Memory Access (DMA) addresses in the network interface controller.

11. The method according to claim 8, and comprising, upon a failure to transfer a packet of the network storage protocol to the remote storage device, retrieving the packet data of the packet from the memory of the host to the processor, and retransmitting the packet with the retrieved packet data.

12. The method according to claim 8, wherein transferring the packet data directly from the memory of the host to the remote storage device comprises calculating a Cyclic Redundancy Check (CRC) over the transferred packet data and transferring the CRC with the packet data.

13. The method according to claim 8, wherein transferring the packet data directly from the remote storage device to the memory of the host comprises verifying a Cyclic Redundancy Check (CRC) that is received with the packet data.

14. The method according to claim 13, and comprising, upon failing to verify the CRC, triggering the processor to verify the CRC, and, using the processor, retrieving at least some of the packet data from the memory of the host and verifying the CRC using the retrieved packet data.

* * * * *